April 20, 1943.  P. C. PEZZELLA  2,317,218
SPRING WHEEL ASSEMBLY
Filed May 25, 1942   2 Sheets-Sheet 1

Inventor:
Philip C. Pezzella,
By Cushman, Darby & Cushman
Attorneys

April 20, 1943.   P. C. PEZZELLA   2,317,218
SPRING WHEEL ASSEMBLY
Filed May 25, 1942   2 Sheets-Sheet 2
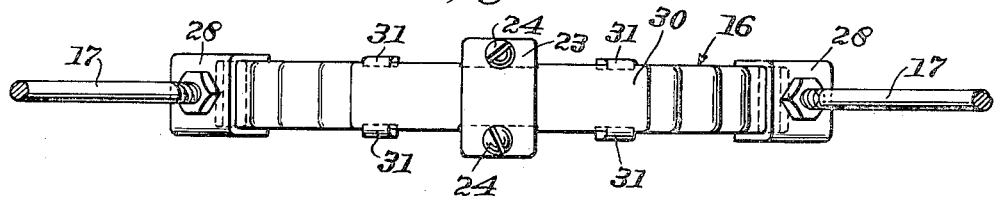
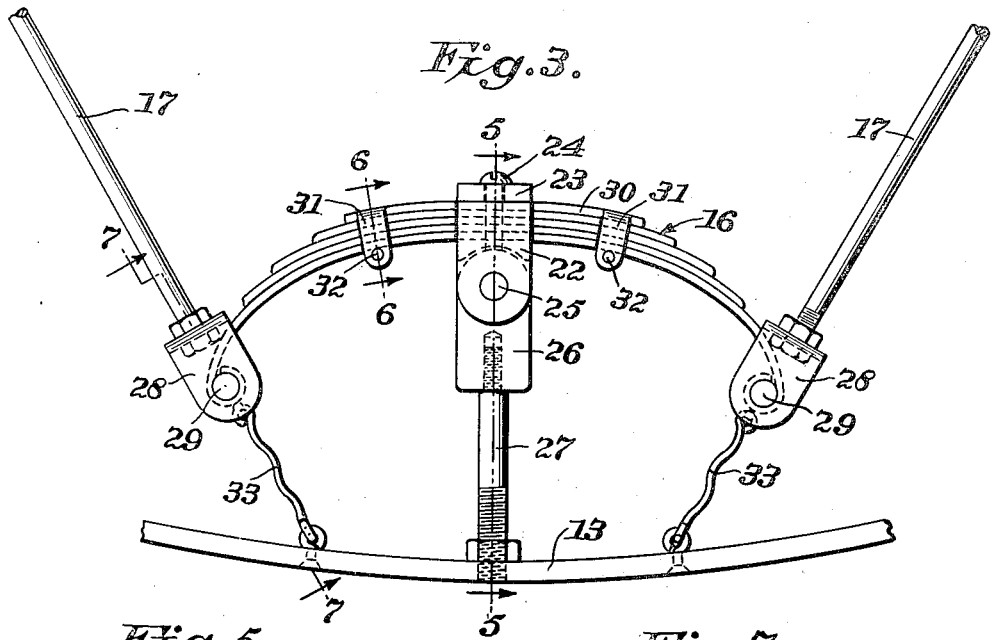
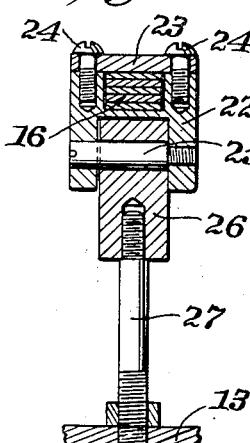
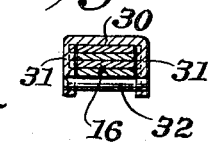
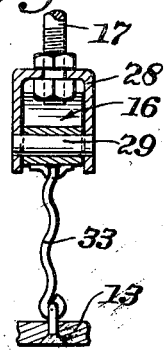
Inventor:
Philip C. Pezzella,
By Cushman, Darby & Cushman
Attorneys.

Patented Apr. 20, 1943

2,317,218

UNITED STATES PATENT OFFICE 2,317,218

SPRING WHEEL ASSEMBLY

Philip C. Pezzella, Brooklyn, N. Y.

Application May 25, 1942, Serial No. 444,409

10 Claims. (Cl. 152—270)

The present invention relates to a tire attachment for wheels and more particularly to an improved resilient spring tire construction which may be readily connected to the rim of any standard type of vehicle wheel so as to provide a substitute for the usual solid or pneumatic rubber tire.

An important object of the invention consists in providing a spring tire construction having an inner rigid rim and an outer sprung rim, and positioning a plurality of leaf springs between the rims, each of the springs being pivotally mounted on a support carried by the outer rim and having spokes connected to its ends and disposed tangentially to the inner rim so as to be connected thereto.

A further object comprehends the provision of a spring tire assembly having means for equalizing and distributing the spring forces evenly and uniformly throughout the wheel.

It is further an object of my invention to provide a spring tire construction having means to safeguard the operation of the tire to prevent excessive flexing of the springs, such as would result in failure of the springs.

It is also an object of my invention to provide a spring tire attachment having an inner rim and an outer rim and having means to limit the axial movement between the inner and outer rims to prevent dishing of the tire.

Further objects and advantages of my invention will be apparent by reference to the following specification and drawings, in which:

Figure 3 is an enlarged detail showing of the leaf spring and its hanger for connection to the outer rim;

Figure 4 is a plan view of the spring shown in Figure 3;

Figure 5 is a cross-section, taken on the line 5—5 of Figure 3;

Figure 6 is a section, taken on the line 6—6 of Figure 3;

Figure 7 is a section, taken on the line 7—7 of Figure 3;

Figure 1:
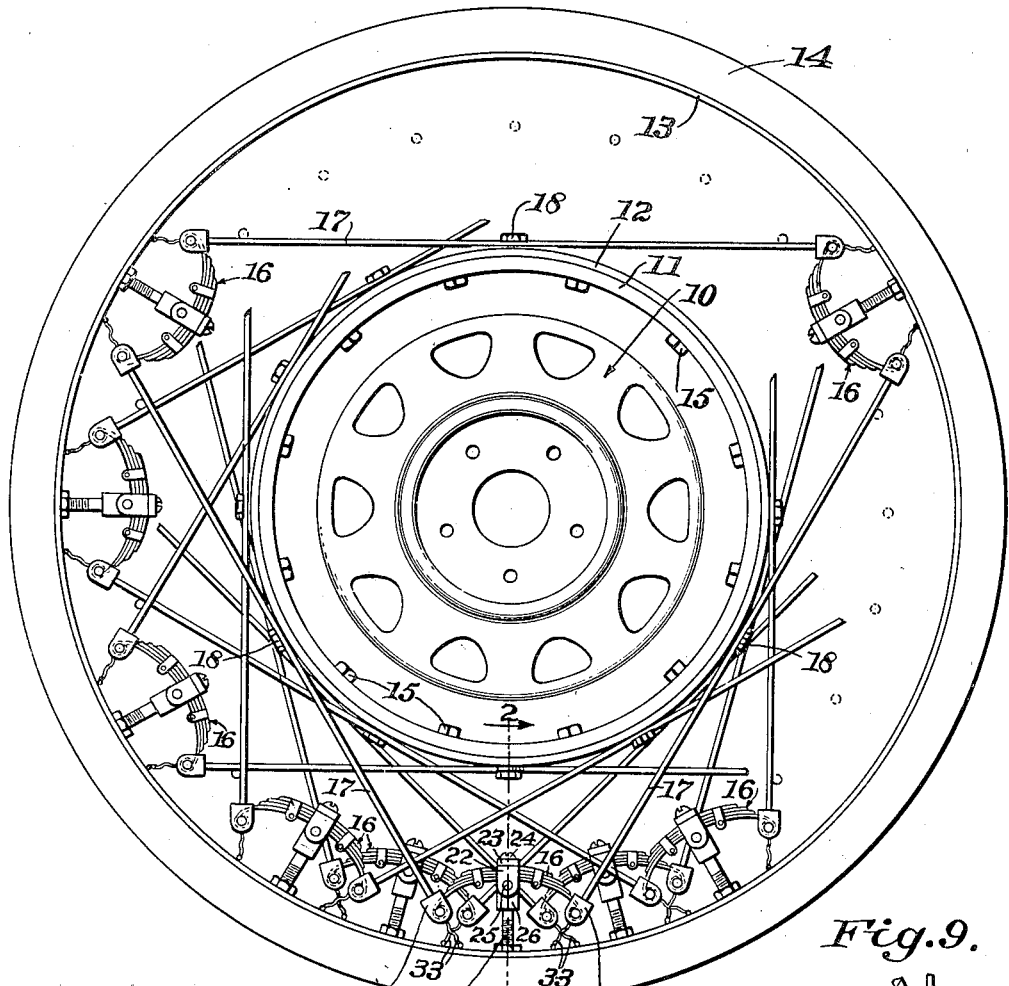
Figure 1 is a face view of the wheel assembly, comprising a standard automobile wheel and the resilient spring tire of my invention, with various parts of the spring tire omitted for clearness of illustration.

Referring to Figure 1 of the drawings, which shows a face view of the tire and wheel assembly, a typical automobile wheel is designated by 10, having the tire-receiving flange or rim 11. The spring tire of my invention comprises an inner non-deformable or rigid rim 12 and an outer rim 13 preferably of spring steel and having a road-engaging surface 14 which may be of any suitable material, such as plastic, rope, etc. The spring tire assembly comprising the inner and outer rims is secured to the flange 11 of the wheel 10 by means of the bolts 15 or any other suitable devices.

Figures 8, 9:
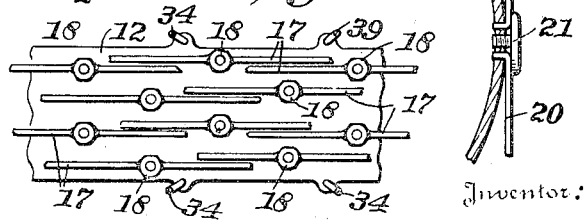
Figure 8 is a sectional plan view, taken substantially on the line 8—8 of Figure 2, showing the manner of fastening and the placement of the spokes on the inner rim.
Figure 9 is an enlarged detail view, showing a modified arrangement for connecting the spokes to the inner rim.

To provide a means for resiliently connecting or springing the outer rim 13 to the inner rim 12, a system of leaf springs and steel spokes is employed. The leaf springs generally shown at 16 and steel spokes 17 are so arranged in units that a series of three springs connected by spokes will form a triangle unit, the sides of which will be chords of the outer rim 13. The spokes forming the sides of the triangle are fastened at their mid-point in tangential relation to the inner rigid rim 12 by any suitable fastening means, preferably the bolts 18. While the preferred form of the invention, as shown in Figures 1 and 8, employs a single spoke 17 connecting the leaf springs 16 and fastened at a mid-point to the inner rim 12, a modified form of the invention is shown in Figure 9 of the drawings which provides for two spokes 19 and 20 to connect the leaf springs to the inner rim 12. These spokes are fastened by any suitable fastener, such as 21, and it is apparent that the two spokes 19 and 20, when fastened to the inner rim, are, in effect, a single spoke and as such are intended to be included within the scope of the appended claims. The spokes may, if desired, be resilient and of a springy material.

Figure 2:
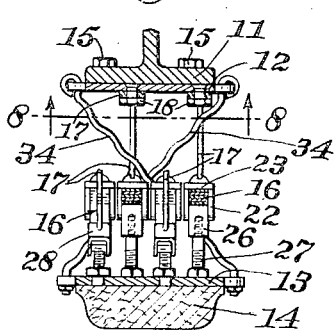
Figure 2 is a cross-sectional view of the spring tire, taken on the line 2—2 of Figure 1.

To evenly distribute the load and the springing forces around the entire wheel, I employ twelve of the leaf springs and twelve spokes to form an assembly of four triangle units, all substantially in the same plane. To give greater resilience and further strengthen the wheel, in the preferred embodiment I may provide additional assemblies in different planes spaced axially of the wheel, preferably four, as shown in Figure 2, with the springs in the second and fourth row fastened to the outer rim at points midway between the points of fastening for the first and third row of springs. The staggered arrangement of these fastening points for the springs is clearly shown in Figure 8 of the drawings. In other words, each of the spokes or rods 17 is connected at one end to a spring 16 and at its other end to a similar spring spaced four springs away from the first-mentioned spring (Figure 1). The spokes 17 are disposed not only tangential to the inner rim 12, but are also located outside of the rim 11 of the wheel. Thus, it will be seen that the spring attachment may be readily connected to or removed from any standard type of wheel at a minimum expenditure of time and effort.

Referring to Figures 3 through 7 of the drawings, which show the details of the spring and hanger employed in my invention, the leaf spring 16 is fastened in the clamp 22 by the bar 23 and the bolts 24. Clamp 22 is pivotally connected at 25 to the hanger 26 which is fastened by a suitable bolt 27 to the outer rim 13. The spokes 17 are connected to the end of the leaf spring by the yoke 28 and the pin 29 shown in detail in Figure 7. The smallest leaf 30 of the leaf spring 16 is provided with the projections 31 which are bent down to form the sides of a clip and are clipped around the other leaves in the leaf spring by means of the rivet 32. This construction serves to strengthen the leaf spring against excessive flexing. To limit the amount of flexing to which the spring 16 may be subjected, I may provide the soft wire cables 33 which are connected between the ends of the leaf spring and the outer rim 13 by an suitable means. It is obvious that chains or the like may be substituted for the soft wire cable 33 used in the preferred form described, without departing from the spirit of the invention.

The pivoted spring hanger 26 previously described is an important feature of my invention, since it functions as an equalizer to distribute the spring stresses evenly between the spokes at each end of the leaf spring. That is to say, the spring hanger clamp 22 can pivot about the axis of the pin 25, so that an excessive spring strain on one end of the leaf spring 16 can be, in measure, absorbed by the other end of the leaf spring and its spoke.

To prevent dishing of the spring tire when in use, I may provide soft wire cables 34 connected between the outer rim 13 and the inner rim 12 as shown in Figures 2 and 8 of the drawings. These cables, which cross each other as shown, will limit axial movement between the rims 12 and 13, and thus greatly reduce any tendency of the spring tire to "dish." It will be apparent that chains or the like may be substituted for wire cables, if desired.

By my invention, I have provided a spring tire construction which, due to the arrangement of the springs and the type of spring hanger employed, is unusually resilient to all points on the periphery of the outer rim and which, when used on a vehicle wheel, will give complete satisfaction. The cushioning effect of my spring tire is further enhanced when the outer rim is itself of a spring or resilient nature, so that the outer rim may be adapted to irregularities of the surface traversed by the wheel. I have also shown and described above, certain safeguards to limit the amount of flexing to which the springs may be subjected and to prevent dishing of the wheel.

While I have specifically shown the preferred arrangement of four assemblies of spring triangle units, it should be understood that the number of spring assemblies employed may be increased or diminished to meet any desired load capacity without departing from the spirit of my invention or the scope of the appended claims.

I claim:

1. A spring tire attachment for vehicle wheels having an inner rim and an outer rim, a plurality of leaf springs pivotally connected at their mid-points to the outer rim, a plurality of spokes fastened to the inner rim and connected to the ends of said leaf springs, means to prevent the flexing of said leaf springs beyond a predetermined maximum, and means connected between the inner rim and the outer rim to limit the axial movement between the inner and outer rims.

2. A spring tire attachment for vehicle wheels having an inner rim and an outer rim, leaf springs between said rims and extending circumferentially thereof, means connecting the springs intermediate their ends to the outer rim, spokes connected to the ends of the springs and disposed tangentially to the inner rim, and means connecting the inner rim to the rim of the wheel.

3. A spring tire attachment for vehicle wheels having an inner rim and an outer rim, leaf springs between said rims and extending circumferentially thereof, means connecting the springs intermediate their ends to the outer rim, spokes connected to the ends of the springs and disposed tangentially to the inner rim, means connecting the spokes to the inner rim, and means connecting the inner rim to the rim of the wheel.

4. A spring tire attachment for vehicle wheels having an inner rim and an outer rim, leaf springs between said rims and extending circumferentially thereof, said outer rim having members extending radially inwardly therefrom, means pivotally connecting the springs intermediate their ends to said members, spokes connected to the ends of the springs and disposed tangentially to the inner rim, and means connecting the inner rim to the rim of the wheel.

5. A spring tire attachment for vehicle wheels having an inner rim and an outer rim, a plurality of leaf springs between said rims and extending circumferentially thereof, means connecting the springs intermediate their ends to the outer rim, spokes connected to the ends of each spring and disposed tangentially to the inner rim, the opposite ends of each spoke being connected to the ends of springs circumferentially spaced from the first-mentioned spring, means connecting the spokes intermediate their ends to the inner rim, and means connecting the inner rim to the rim of the wheel.

6. A spring tire attachment for vehicle wheels having an inner rim and an outer rim, a plurality of leaf springs between said rims and extending circumferentially thereof, said outer rim having radially disposed members extending inwardly therefrom, means pivotally connecting intermediate portions of the springs to said members, spokes connecting the ends of each spring to the ends of springs spaced therefrom, said spokes being disposed tangentially to the inner rim, and means connecting the inner rim of the attachment to the rim of the wheel.

7. A spring tire attachment for vehicle wheels having an inner rigid rim and an outer flexible rim, a plurality of leaf springs between said rims and arranged in transverse rows extending circumferentially of the wheel, said outer rim having radially disposed members extending inwardly therefrom, means pivotally connecting intermediate portions of the springs to said members, spokes connecting the ends of each spring to the ends of springs spaced therefrom, said spokes being disposed tangentially to the inner rim, flexible means connecting the inner rim to the outer rim to prevent dishing of the spring tire attachment, and means connecting the inner rim to the rim of the wheel.

8. A spring tire attachment for vehicle wheels having an inner rim and an outer rim, leaf springs between said rims and extending circumferentially thereof, means connecting the springs intermediate their ends to the outer rim, spokes connected to the ends of the springs and disposed tangentially to the inner rim, means connecting the inner rim to the rim of the wheel, and flexible means connecting the ends of the springs to the outer rim for limiting the flexing movement of the springs.

9. A spring tire attachment for vehicle wheels having an inner rim and an outer rim, leaf springs between said rims and extending circumferentially thereof, means connecting the springs intermediate their ends to the outer rim, spokes connected to the ends of the springs and disposed tangentially to the inner rim, means connecting the inner rim to the rim of the wheel, and flexible means connecting the inner rim to the outer rim to prevent dishing of the spring tire attachment.

10. A spring tire attachment for vehicle wheels having a rigid inner rim and an outer flexible rim, leaf springs between said rims and extending circumferentially thereof, means connecting the springs intermediate their ends to the outer rim, spokes connected to the ends of the springs and disposed tangentially to the inner rim, means connecting the inner rim to the rim of the wheel, flexible means connecting the ends of the springs to the outer rim for limiting the flexing movement of the springs, and flexible means connecting the inner rim to the outer rim to prevent dishing of the spring tire attachment.

PHILIP C. PEZZELLA.